March 24, 1936.      K. J. MONRAD      2,035,334
THERMOMETER SPOON
Filed May 2, 1932
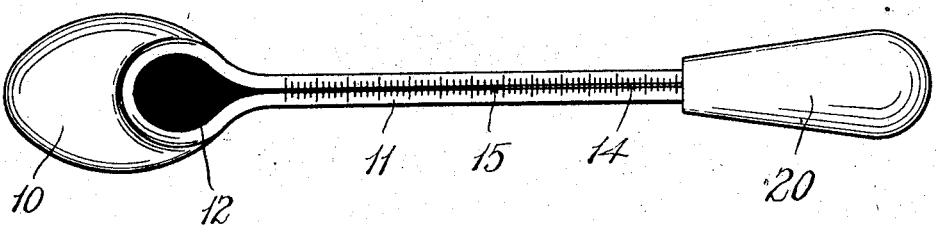
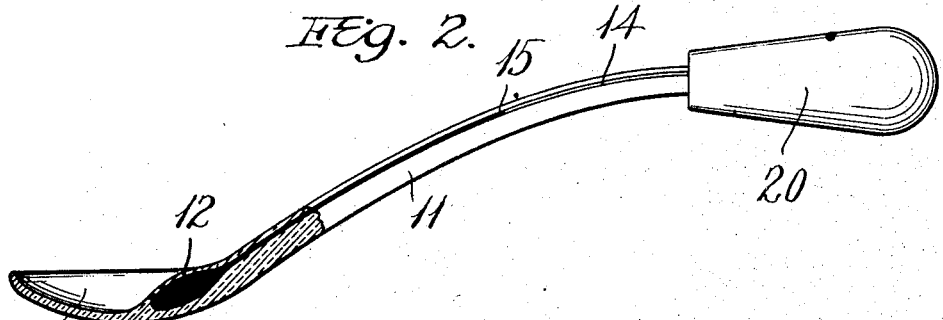
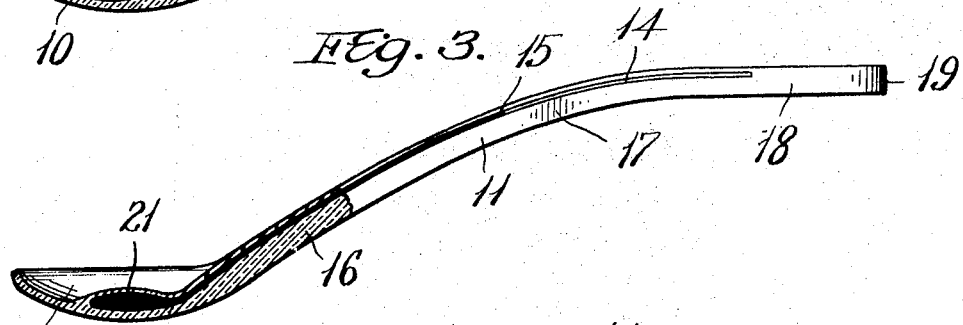
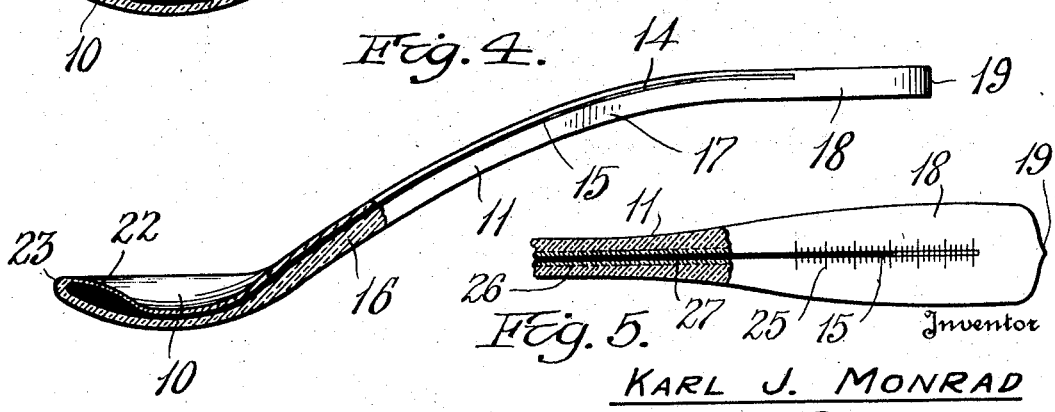
Inventor
KARL J. MONRAD
By H. H. Snelling
Attorney Patented Mar. 24, 1936

2,035,334

UNITED STATES PATENT OFFICE 2,035,334

THERMOMETER SPOON

Karl J. Monrad, Little Falls, N. Y.

Application May 2, 1932, Serial No. 608,778

2 Claims. (Cl. 73—52)

This invention relates to thermometers and has for its principal object the provision of a thermometer built in the shape of a spoon.

An important feature of the present invention consists in the provision of a spoon having in its bowl the bulb of a thermometer and having along its stem graduations so that the temperature of the material in the bowl can be determined by the passage of the mercury or other fluid in the capillary tube in the stem.

An additional object of the present invention consists in the provision of a spoon having a thermometer bulb in the bowl of the spoon and forming the ordinary thermometer stem so as to be the stem of the spoon and providing a handle of non-heat-conducting material such, for example, as wood.

Many times it is desired to take the temperature of a small quantity of a fluid, for example, when there is a large quantity of the fluid at a known temperature and a very small portion is desired at a lower temperature. The small quantity is removed in a spoon but the quantity is so small that it is not possible to determine the rate of lowering of the temperature, or, what is the same thing, it is not possible to determine when this smaller quantity reaches the desired temperature.

My invention contemplates the provision of a thermometer which can measure the heat of the small quantity in the spoon or equally well the heat in the larger body, the latter merely by immersing the bowl of the spoon in the liquid just as an ordinary thermometer is used. I intend that the spoon be made so sturdy that it can be used for stirring and in cases of high temperature the spoon could be removed from the larger quantity of material and the reading taken while some of the material is still in the spoon.

In the drawing:

Figure 1 is a top plan view of the spoon embodying my invention.

Figure 2 is a side elevation of the spoon shown in Figure 1.

Figure 3 is a modified form of a one-piece thermometer spoon.

Figure 4 is a similar view in which the bulb of the thermometer is near the point of the bowl of the spoon.

Figure 5 is a flat-ware plan view.

The spoon of my invention can be of any size or shape but I prefer that the greater part, if not all, of the bulb of the thermometer shall be below the top level of ths bowl of the spoon, this being illustrated in all four of the figures. In Figure 1 the bowl 10 of the spoon is of normal size and shape throughout the outer half of the bowl but in the inner half, that is, the portion adjacent the stem 11, the bowl is slightly enlarged to accommodate the bulb 12 of the thermometer, the stem of which is the stem 11 of the spoon which contains the usual capillary tube 14 in which may be seen as at 15 the top of the column of expansive material, usually mercury or colored alcohol.

The stem 11 of the spoon may be substantially cylindrical as shown in Figures 1 and 2 but I rather prefer for ordinary use that the outline of the spoon shall be in accordance with usual practice, the spoon being narrowest at the point 16 and gradually widening to a point such as 17 and then increasing in transverse width to form the handle 18 which can follow any ordinarily used configuration usually having a rounded end 19. In the forms shown in Figures 1 and 2 I prefer that the stem 11 shall be of uniform circular cross section so as to slip readily and somewhat snugly into the wooden handle 20 which allows the use of the spoon in connection with high temperature liquids such, for example, as in candy making or frying. When the device is to be used for such purposes I find it convenient to make the entire spoon, except the handle 20, of such a high temperature glass as pyrex but I also find it convenient to use a transparent unbreakable material that can be molded such, for example, as durite.

In Figure 5 I have shown a modification which would be used where the range of temperature is sufficiently small to allow all of the graduations 25 to be near the end of the handle. The spoon in this modification, like the spoons of Figures 3 and 4, follow the usual configuration of a flatware spoon irrespective of the size, whether teaspoon, tablespoon, or larger. I have also shown in this figure a method of building a spoon which will sometimes be used. Ordinarily, I prefer to blow the capillary tube directly in the spoon; sometimes I will mold it so as to have the tube or bore, and sometimes, as seen in Figure 5, I will mold the spoon leaving a groove 26. The thermometer tube, made in ordinary way, can then be laid in this tube and then be secured in place by any usual method and finally be annealed, preferably so that there will be no indication of the way in which the spoon is made.

In all of the examples illustrated the bulb is in the bowl of the spoon, the bulb 12 in Figures 1 and 2 being adjacent the junction between the stem and the bowl whereas the bulb 21 in the flatware modification shown in Figure 3 is in the center of the bowl and the bulb 22 of the thermometer in the similar modification shown in Figure 4 is at the extreme tip 23 of the spoon, this latter form being particularly advantageous in cases where the depth of the larger quantity of liquid to be measured for temperature is relatively shallow as, for example, when the depth of the liquid is only about half of the length of the bowl of the spoon.

What I claim is:

1. A combined thermometer and spoon, the bulb of the thermometer being in, and integral with the bowl of the spoon and the capillary tube of the thermometer extending in, and integral with the stem of the spoon.

2. A combined spoon and thermometer, comprising a transparent body including integral handle stem and bowl portions, the bowl portion of said body being hollowed to provide a bulb for reception of a thermal expansive fluid and the handle stem portion being provided with a bore communicating with said bulb, calibrations provided on said handle stem portion along said bore, and a thermal expansive fluid filling said bulb and extending in said bore.

KARL J. MONRAD.